(12) United States Patent
Thouppuarachchi

(10) Patent No.: US 11,403,070 B2
(45) Date of Patent: Aug. 2, 2022

(54) SYSTOLIC ARRAY DESIGN FOR SOLVING PARTIAL DIFFERENTIAL EQUATIONS

(71) Applicant: Vorticity Inc., Redwood City, CA (US)

(72) Inventor: Chirath Neranjena Thouppuarachchi, Redwood City, CA (US)

(73) Assignee: Vorticity Inc., Redwood City, CA (US)

( * ) Notice: Subject to any disclaimer, the term of this patent is extended or adjusted under 35 U.S.C. 154(b) by 0 days.

(21) Appl. No.: 16/989,829

(22) Filed: Aug. 10, 2020

(65) Prior Publication Data

US 2021/0055913 A1 Feb. 25, 2021

Related U.S. Application Data

(60) Provisional application No. 62/888,947, filed on Aug. 19, 2019.

(51) Int. Cl.
*G06F 7/64* (2006.01)
*G06F 17/13* (2006.01)

(52) U.S. Cl.
CPC ............ *G06F 7/64* (2013.01); *G06F 17/13* (2013.01)

(58) Field of Classification Search
CPC .... G06F 7/64; G06F 17/13; G06F 2207/3892; G06F 15/8046; G06F 7/00–62;

(Continued)

(56) References Cited

U.S. PATENT DOCUMENTS

| 8,583,720 B2* | 11/2013 | Kusmanoff | G06F 17/13 |
| | | | 708/446 |
| 2013/0116988 A1* | 5/2013 | Zhang | G06F 8/40 |
| | | | 703/2 |

(Continued)

OTHER PUBLICATIONS

P. Strbac et al. in "Hierarchical Model of a Systolic Array for Solving Differential Equations Implemented as an Upgraded Petri Net" in WSEAS Transactions on Systems, Issue 1, vol. 8, 2009. Retrieved from the Internet <http://www.wseas.us/e-library/transactions/systems/2009/28-658.pdf> (Year: 2009).*

(Continued)

*Primary Examiner* — Emily E Larocque
*Assistant Examiner* — Carlo Waje
(74) *Attorney, Agent, or Firm* — Fenwick & West LLP

(57) ABSTRACT

Embodiments relate to a system for solving differential equations. The system is configured to receive problem packages corresponding to problems to be solved, each comprising at least a differential equation and a domain. A solver stores a plurality of nodes of the domain corresponding to a first time-step, and processes the nodes over a plurality of time-steps using a systolic array comprising hardware for solving the particular type of the differential equation. The systolic array processes each node to generate a node for a subsequent time-step using a sub-array comprising a plurality of branches, each branch comprising a respective set of arithmetic units arranged in accordance with a corresponding term of the discretized form of the differential equation, and an aggregator configured to aggregate the corresponding terms from each branch to generate node data for the subsequent time-step.

20 Claims, 9 Drawing Sheets

(58) Field of Classification Search
CPC ......... G06F 7/66–785; G06F 17/00–12; G06F 17/14–40
See application file for complete search history.

(56) References Cited

U.S. PATENT DOCUMENTS

2014/0324399 A1* 10/2014 Barron .................... G06F 17/13
 703/2
2016/0267349 A1* 9/2016 Shoaib .................... G06F 16/51

OTHER PUBLICATIONS

D. J. Evans and G. M. Megson, "Systolic arrays for group explicit methods for solving parabolic partial differential equations," [1988] Proceedings. International Conference on Systolic Arrays, 1988, pp. 315-329, doi: 10.1109/ARRAYS.1988.18072. (Year: 1988).*

* cited by examiner $$\frac{\partial u}{\partial t} + u\frac{\partial u}{\partial x} + v\frac{\partial u}{\partial y} = -\frac{1}{\rho}\frac{\partial p}{\partial x} + \nu\left(\frac{\partial^2 u}{\partial x^2} + \frac{\partial^2 u}{\partial y^2}\right)$$

$$\frac{\partial v}{\partial t} + u\frac{\partial v}{\partial x} + v\frac{\partial v}{\partial y} = -\frac{1}{\rho}\frac{\partial p}{\partial y} + \nu\left(\frac{\partial^2 v}{\partial x^2} + \frac{\partial^2 v}{\partial y^2}\right)$$

$$\frac{\partial^2 p}{\partial x^2} + \frac{\partial^2 p}{\partial y^2} = -\rho\left(\frac{\partial u}{\partial x}\frac{\partial u}{\partial x} + 2\frac{\partial u}{\partial y}\frac{\partial v}{\partial x} + \frac{\partial v}{\partial y}\frac{\partial v}{\partial y}\right)$$

FIG. 8A

$$\frac{u_{i,j}^{n+1} - u_{i,j}^n}{\Delta t} + u_{i,j}^n \frac{u_{i,j}^n - u_{i-1,j}^n}{\Delta x} + v_{i,j}^n \frac{u_{i,j}^n - u_{i,j-1}^n}{\Delta y} =$$

$$-\frac{1}{\rho} \frac{p_{i+1,j}^n - p_{i-1,j}^n}{2\Delta x}$$

$$+ \nu \left( \frac{u_{i+1,j}^n - 2u_{i,j}^n + u_{i-1,j}^n}{\Delta x^2} + \frac{u_{i,j+1}^n - 2u_{i,j}^n + u_{i,j-1}^n}{\Delta y^2} \right)$$

$$\frac{v_{i,j}^{n+1} - v_{i,j}^n}{\Delta t} + u_{i,j}^n \frac{v_{i,j}^n - v_{i-1,j}^n}{\Delta x} + v_{i,j}^n \frac{v_{i,j}^n - v_{i,j-1}^n}{\Delta y} =$$

$$-\frac{1}{\rho} \frac{p_{i,j+1}^n - p_{i,j-1}^n}{2\Delta y}$$

$$+ \nu \left( \frac{v_{i+1,j}^n - 2v_{i,j}^n + v_{i-1,j}^n}{\Delta x^2} + \frac{v_{i,j+1}^n - 2v_{i,j}^n + v_{i,j-1}^n}{\Delta y^2} \right)$$

$$\frac{p_{i+1,j}^n - 2p_{i,j}^n + p_{i-1,j}^n}{\Delta x^2} + \frac{p_{i,j+1}^n - 2p_{i,j}^n + p_{i,j-1}^n}{\Delta y^2} =$$

$$\rho \left[ \frac{1}{\Delta t} \left( \frac{u_{i+1,j} - u_{i-1,j}}{2\Delta x} + \frac{v_{i,j+1} - v_{i,j-1}}{2\Delta y} \right) \right.$$

$$- \frac{u_{i+1,j} - u_{i-1,j}}{2\Delta x} \frac{u_{i+1,j} - u_{i-1,j}}{2\Delta x} - 2\frac{u_{i,j+1} - u_{i,j-1}}{2\Delta y} \frac{v_{i+1,j} - v_{i-1,j}}{2\Delta x}$$

$$\left. - \frac{v_{i,j+1} - v_{i,j-1}}{2\Delta y} \frac{v_{i,j+1} - v_{i,j-1}}{2\Delta y} \right]$$

FIG. 8B

SYSTOLIC ARRAY DESIGN FOR SOLVING PARTIAL DIFFERENTIAL EQUATIONS

CROSS-REFERENCE TO RELATED APPLICATION

This application claims the benefit of U.S. Provisional Application No. 62/888,947, filed on Aug. 19, 2019, which is hereby incorporated by reference in its entirety.

BACKGROUND

The present disclosure generally relates to dedicated hardware for solving differential equations, and specifically relates to systolic arrays for solving differential equations.

Differential equations are ubiquitous in describing fundamental laws of nature, human interactions and many other phenomena. Applications include fluid dynamics, molecular dynamics, electronic structure, high frequency options trading, brain tissue simulations, satellite orbitals, nuclear explosion simulations, black hole simulations, etc.

Solving differential equations has been a major use of computers since their advent in the mid-1900s. Today, estimates show that over 50% of high performance computing is diverted towards solving differential equations, from supercomputers at national labs to small computer clusters in medium size companies. As such, a need exists for computers that can more efficiently solve differential equations.

SUMMARY

Embodiments relate to a system for solving differential equations. The system receives problem packages corresponding to problems to be solved, each problem package including at least a differential equation and a domain. The differential equation is associated with a discretized form having a plurality of terms. The domain may be associated with a mesh of nodes, or the system may construct a mesh based upon the domain.

A solver stores a plurality of nodes of the domain corresponding to a first time-step in a first memory, and uses one or more selected systolic arrays to process the nodes over a plurality of steps (e.g., time-steps). Each systolic array comprises hardware for discretized solving of a particular type of differential equation. The solver selects a systolic array based upon a type of the differential equation.

In one or more embodiments, the selected systolic array comprises a plurality of sub-arrays each configured to process a respective node of the domain to generate a node for a subsequent step. Each sub-array includes a plurality of branches where each branch has a respective set of arithmetic units arranged in accordance with a corresponding term of the discretized form of the differential equation to generate the corresponding term based upon the node data, data of one or more nearby nodes of the domain, and/or one or more constants. Each sub-array further includes an aggregator configured to receive and aggregate the corresponding terms generated by each branch to produce node data for the subsequent step. The node data for the subsequent step is stored in a second memory of the solver. The solver may, over subsequent steps, pass the node data from the second memory through the systolic array for storage in the first memory, and vice versa.

BRIEF DESCRIPTION OF THE DRAWINGS

FIG. 8A illustrates Naiver-Stokes governing equations in two-dimensional Cartesian coordinates, in accordance with some embodiments.

FIG. 8B illustrates discretized equations corresponding to the differential equations illustrated in FIG. 8A.

Figure 1:
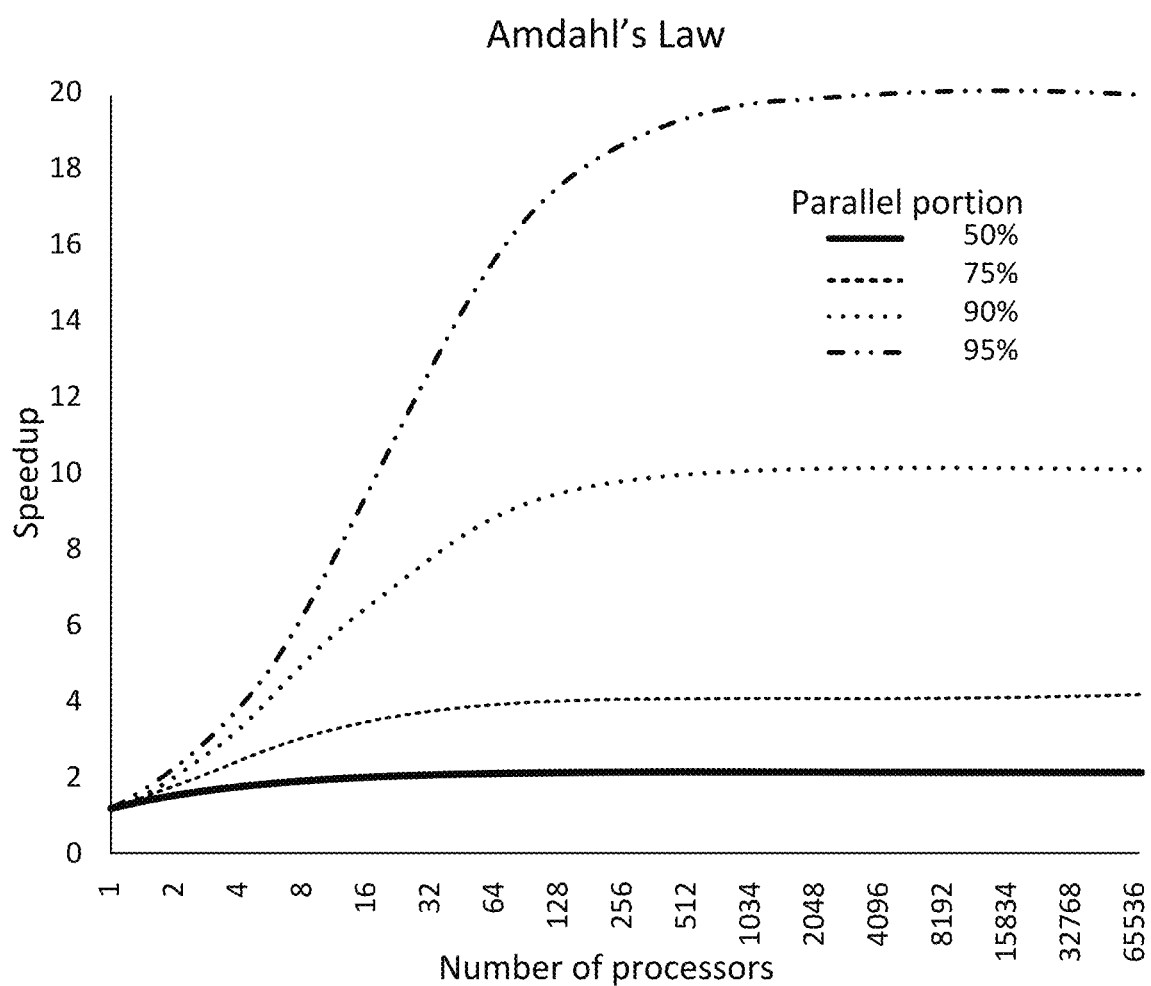
FIG. 1 is a graph illustrating the effects of Amdahl's law.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments herein are directed to a purpose built computing architecture to enable fast solving of differential equations within large domains with complicated boundary conditions. Differential equations are ubiquitous in describing fundamental laws of nature, human interactions and many other phenomena. Applications of differential equations include fluid dynamics, molecular dynamics, electronic structure, high frequency options trading, brain tissue simulations, satellite orbitals, nuclear explosion simulations, black hole simulations, etc.

While simple differential equations can be solved with analytical solutions, many more complicated differential equations must be solved numerically in order to obtain useful results. This usually involves breaking up a problem domain into many slices/nodes/particles etc., and solving a discretized form of the equation on each slice/node/particle. This can be a tedious process. In addition, as domain size and accuracy requirements increase (e.g., resolution of the solution, maximum partition size possible, etc.), the number of calculations needed to be performed can increase dramatically.

For example, the Navier-Stokes equations describe how velocity, pressure, temperature, and density of a moving fluid are related. FIG. 8A illustrates incompressible Navier-Stokes governing equations in two-dimensional Cartesian coordinates, in accordance with some embodiments. The equations involve independent variables (x and y spatial coordinates of some domain, and time t), and well as dependent variables such pressure p and components of the velocity vector (u and v corresponding to in the x and y directions respectively) that are functions of the independent variables.

With the exception of a few rare boundary conditions, the Navier-Stokes equations do not have any known analytical solutions. As such, practically useful problems involving Navier-Stokes equations are solved numerically using discretization methods such as finite volume methods. The finite volume method (FVM) is a method for representing and evaluating partial differential equations in the form of algebraic equations where values are calculated at discrete places on a meshed geometry. "Finite volume" refers to the small volume surrounding each node point on a mesh. FIG. 8B illustrates discretized equations corresponding to the differential equations illustrated in FIG. 8A.

The usage of current computer systems (e.g., general-purpose computers) has several problems. In many applications, each particle or node in the domain of the differential equation to be solved requires perhaps ~$10^2$-$10^3$ floating point operations to calculate the next time step. Since these operations have to be done sequentially, the best time scaling that the simulation or solution can achieve is described in Equation (1) below, even without accounting for the clock cycles needed in a von Neumann architecture to fetch instructions, decode, access memory multiple times to perform a single operation.

$$\frac{\text{computer clock speed } [s-1]}{\text{operations per node } [\text{timestep}-1] \times \text{number of nodes in domain}} \text{timesteps/second} \quad (1)$$

For problems that require "strong vertical scaling" such as molecular dynamics, this ceiling is a major problem where even the best supercomputers can only muster several microseconds of simulation time for several days' worth of compute time.

When possible, for large domain sizes, parallel computing can be used to speed up the solution. However the need to pass large amounts of data between the parallel computing units in such a setup slows down the time to solution. For example, when engineers use 1000 cores, the speed up is no more than 10 times as using a single core. This problem is generally referred to as Amdahl's law. FIG. 1 is a graph illustrating the effects of Amdahl's law. As illustrated in FIG. 1, the speed up in latency of the execution of tasks from using additional parallel processors levels off even as additional parallel processors are added, due to the speedup being limited by the serial portion of the program.

In some applications, a problem may consist of both a small time scale and a very large domain size. An example of this is direct numerical simulations of the Navier Stokes equation. Typically, these types of problems are never solved except on rare occasions on national super computers despite the unprecedented accuracy.

In addition, in cases where the solution at a particular time interval needs to be recorded, then in most cases the computation will stop to download this timestep information, further adding to the time to solution for a given problem.

System Overview

Figure 2:
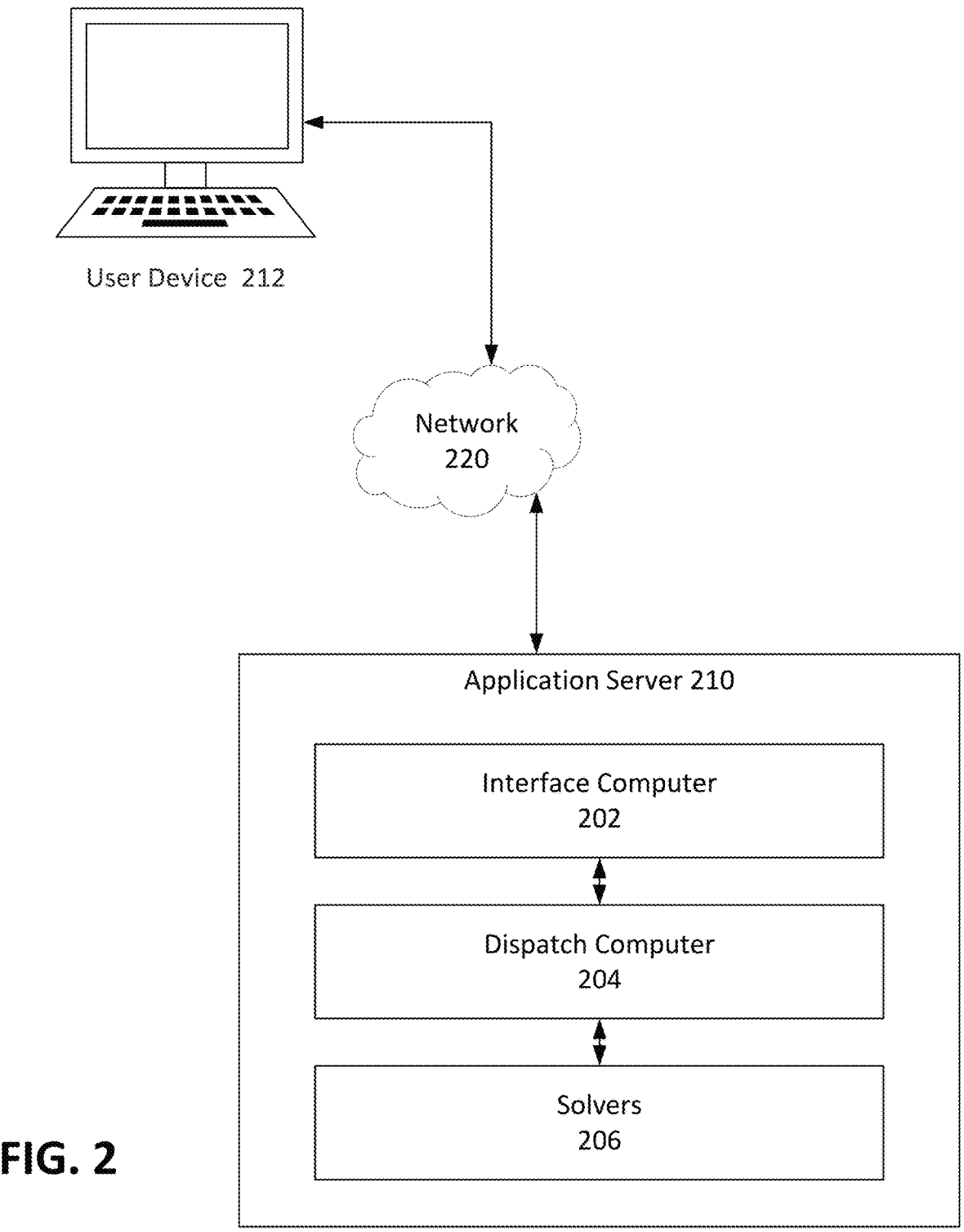
FIG. 2 illustrates a high level diagram of a system for solving differential equations, in accordance with some embodiments.

Embodiments are directed to a computer architecture specialized to solve differential equations that addresses the problems expounded above. FIG. 2 illustrates a high level diagram of a system for solving differential equations, in accordance with some embodiments. The system comprises an interface computer 202, a dispatch computer 204, and a plurality of solver units 206. In some embodiments, the interface computer 202, dispatch computer 204, and solver units 206 are implemented on an application server 210. While FIG. 2 illustrates a single application server 210, it is understood that in other embodiments, the interface computer 202, dispatch computer 204, and solvers 206 may be implemented on multiple servers or devices, on a cloud server, etc.

In some embodiments, the user accesses the application server 210 from a user device 212, such as a PC, laptop, workstation, mobile device, etc. The user device 212 may access the application server 210 through a network 220 (e.g., the Internet). In other embodiments, the user device 212 may connect to the application server 210 via a direct line connection (e.g., a direct line connection to the interface computer 202). In addition, although FIG. 2 only shows a single user device 212 connecting to the application server 210, it is understood that in some embodiments, many user devices may concurrently connect to the application server 210 (e.g., via the network 220).

The user at the user device 212 may transmit to the application server 210 (e.g., through the network 220) one or more problems involving differential equations to be solved. In some embodiments, the user device 212 transmits each problem in the form of the problem package, comprising at least a differential equation associated with the problem, and a domain. In some embodiments, the problem package further comprises a mesh (or particle domain) for the problem, one or more boundary conditions, initial conditions, flow conditions (such as density and viscosity), a solve type (e.g., 3D incompressible DNS Navier Stokes), and/or the like. The problem package may be sent to the interface computer 202 over the secured internet using a provided API of the interface computer 202.

The interface computer 202 receives the problem package, which is processed by the dispatch computer 204 and dispatched to the solvers 206. The solvers 206 generate a solutions package comprising a solved domain that is transmitted back to the user device 212. The solutions package may further comprise one or more averages, one or more solver metrics, one or more errors messages, etc.

Figure 3:
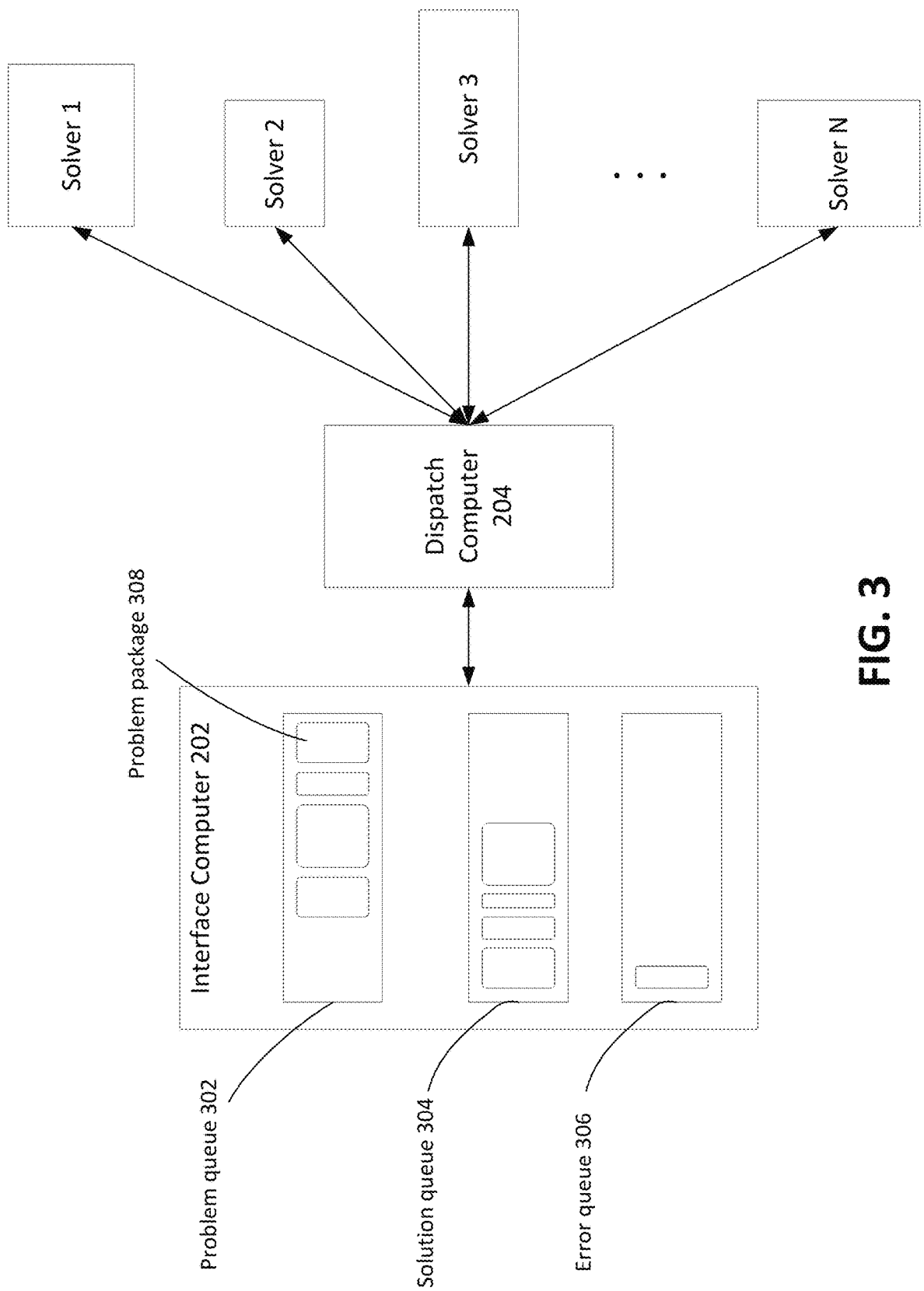
FIG. 3 illustrates a diagram of the interface computer, dispatch computer, and solver units, in accordance with some embodiments.

FIG. 3 illustrates a diagram of the interface computer 202, dispatch computer 204, and solver units 206, in accordance with some embodiments. The interface computer 202 is networked to both the user (e.g., the user device 212) and the dispatch computer 204. The interface computer 202 comprises a problem queue 302, a solution queue 304, and an error queue 306. The interface computer 202 is configured to accept incoming problems to be solved by various interested parties (e.g., problem packages from one or more users at user devices 212), and add the received problem packages 308 to the problem queue 302. In some embodiments, the interface computer 202 may first check the received problem package for accuracy. For example, the interface computer 202 may, if the problem package specifies a time step size and is associated with certain types of differential equations, that the specified time step conforms with the Courant-Friedrichs-Lewy (CFL) convergence condition. In cases where the problem package specifies an unstructured mesh, the interface computer 202 may check if the specified mesh is well-formed. In some embodiments, the interface computer 202 may receive a problem package that comprises geometry information with initial and boundary conditions instead of a mesh, whereupon the interface computer may generate a mesh for the problem based upon the received geometry information and conditions.

The interface computer 202 sends problem packages 308 to the dispatch computer 204 to be solved by one or more of the plurality of solvers 206. In some embodiments, each problem package within the problem queue 302 may be assigned a priority level. The priority level for a problem package 302 may be based upon a provided indication within the problem package, the user from which the problem package was received, one or more parameters of the problem package (e.g., type of differential equation, size of domain, etc.), size of the problem package, an amount of time the problem package has been in the problem queue 302, and/or any combination thereof.

The interface computer 202 is further configured to receive solution information from the dispatch computer 204. In some embodiments, the solution information is received in the form of one or more solution packages (e.g., as described above). In other embodiments, the interface computer 202 reformats the received solution information to form one or more solution packages. The interface computer 202 stores the one or more solution packages in the solution queue 304, and transmits the solution packages from the solution queue 304 to their respective users (e.g., to the user devices 212 responsible for sending the problem package corresponding to the solution package).

In some embodiments, the interface computer 202 receives error information from the dispatch computer 204, corresponding to any errors encountered by the solvers 206 when solving the problem. In some embodiments, the interface computer 202 checks the fidelity of the results of the received solution information, and generates one or more errors if any issues are found (e.g., pressure, density, velocity, etc. parameters not being bounded). The determined errors may be stored in the error queue 306, to be transmitted to corresponding users.

The dispatch computer 204 is networked to the interface computer 202 and to one or multiple solver units 206. The dispatch computer determines which solver 206 is the best to solve a given user problem at a given time. As illustrated in FIG. 3, the dispatch computer 204 may be in communication with a plurality of solvers 206 (e.g., solvers 206-1 through 206-n). In some embodiments, the dispatch computer 204 monitors an availability of the solvers 206 (e.g., a capacity of each solver to process additional problems) and the problem queue 302 of the interface computer 202, in order to determine which problem packages 308 should be processed by which of the solvers 206.

The solvers 206 are the workhorses of the system, and are configured to generate solutions to the various problems that come to the system. The solvers may be of different types. For example, each of the solvers 206 may be optimized for one or more specific applications, such as fluid dynamics, molecular dynamics, electronic structure, etc. In some embodiments, each solver 206 may also be optimized to solve domains of different sizes. The various sizes may help optimize the use of the hardware by allocating larger problems to the larger solvers and smaller problems to the smaller solvers.

Solver Structure

Figure 4:
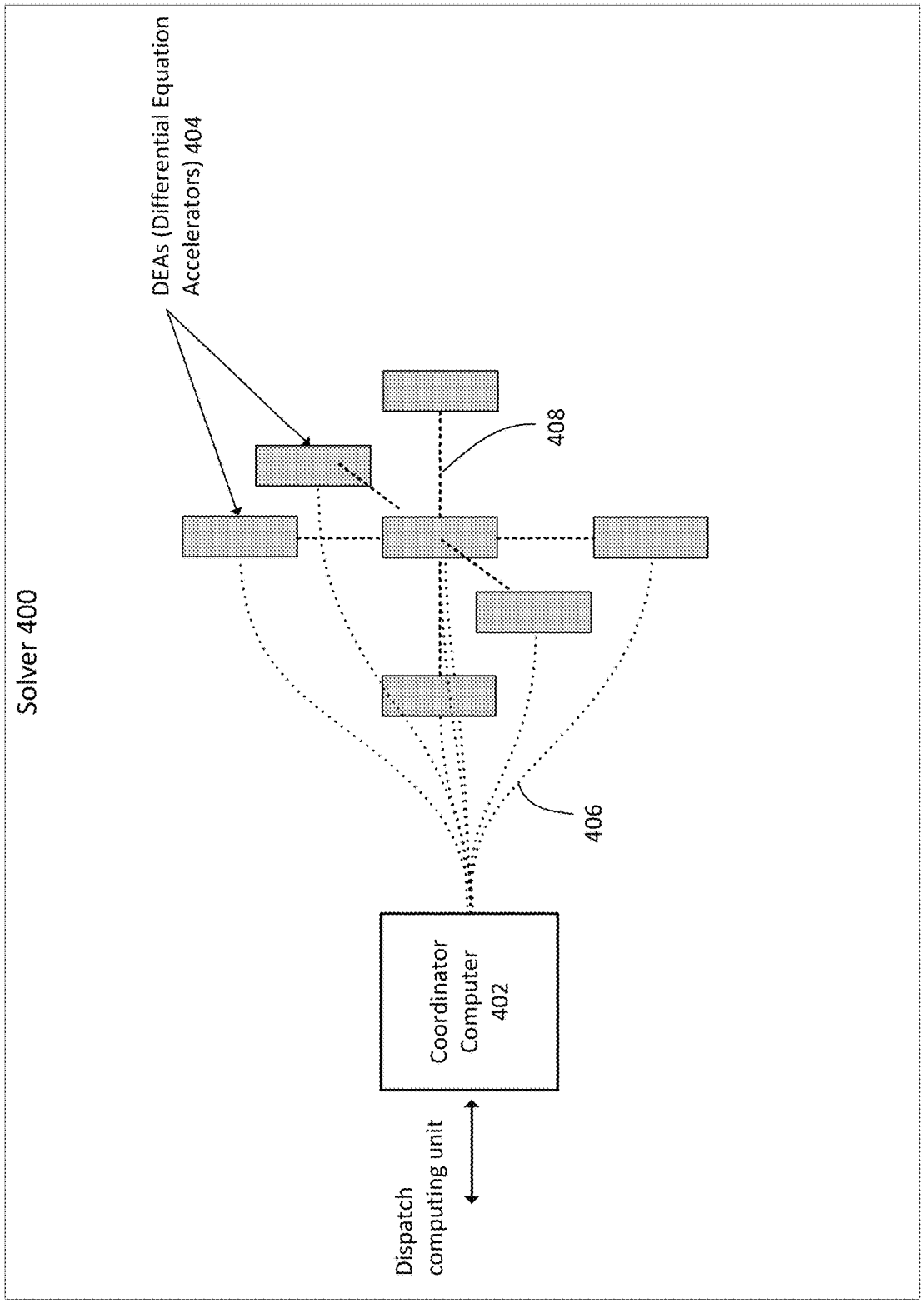
FIG. 4 is a diagram illustrating components of a solver, in accordance with some embodiments.

FIG. 4 is a diagram illustrating components of a solver, in accordance with some embodiments. The solver 400 illustrated in FIG. 4 may correspond to one of the solvers 206 illustrated in FIGS. 2 and 3. The solver 400 comprises a coordinator computer or circuit 402, multiple compute units (referred to as Differential Equation Accelerator (DEA) circuits, or DEAs) 404, one or more DEA-Coordinator interconnects 406, and one or more DEA-DEA interconnects 408.

The coordinator computer 402 (or coordinator 402) is connected to the dispatch computer (e.g., dispatch computer 204) on one side and to multiple DEAs 404 on the other. The coordinator 402 is responsible for coordinating the various aspects of the DEA when solving a user problem. For example, the coordinator 402 may, in response to receiving a problem package, divide the domain of the problem into a plurality of subdomains, and assigns each subdomain to a respective DEA 404. The coordinator 402 may synchronize the DEAs 404 and initiates solving operations by the DEAs 404. The coordinator 402 further downloads results from each of the DEAs 404.

The solver 400 comprises a plurality of DEAs 404. Each DEA 404 is a circuit configured to receive a subdomain of a problem, and generate solution data for the received subdomain. The coordinator computer 402 and the DEAs 404 are connected via DEA-Coordinator interconnects 406 and DEA-DEA interconnects 408, allowing for the coordinator 402 to manage operations of the DEAs 404, and for the DEAs 404 to share stored domain information with each other (discussed in greater detail below).

The DEA-Coordinator interconnects 406 and DEA-DEA interconnects 408 may be implemented as cabling connecting the coordinator 402 to the DEAs 404, and the DEAs 404 to each other, respectively. In some embodiments the interconnects 406 and 408 may be implemented using PCI Express cables (e.g., PCIe v4.0). The number of interconnects between the DEAs 404 may be contingent on how the domain is sliced up across the DEAs in that solver, e.g., based on a partitioning scheme of the solver for partitioning received domains. For example, if the solver is configured to slice the domain into pyramids, then the number of interconnects may be smaller compared to if the solver were configured to slice up received domains into higher order polygons. In some embodiments, if the number of DEAs 404 is large, then it may be hard to physically connect all the DEAs 404 onto one coordinator 402. In such cases, relays (not shown) can be used to bunch up some of the cabling.

Figure 5:
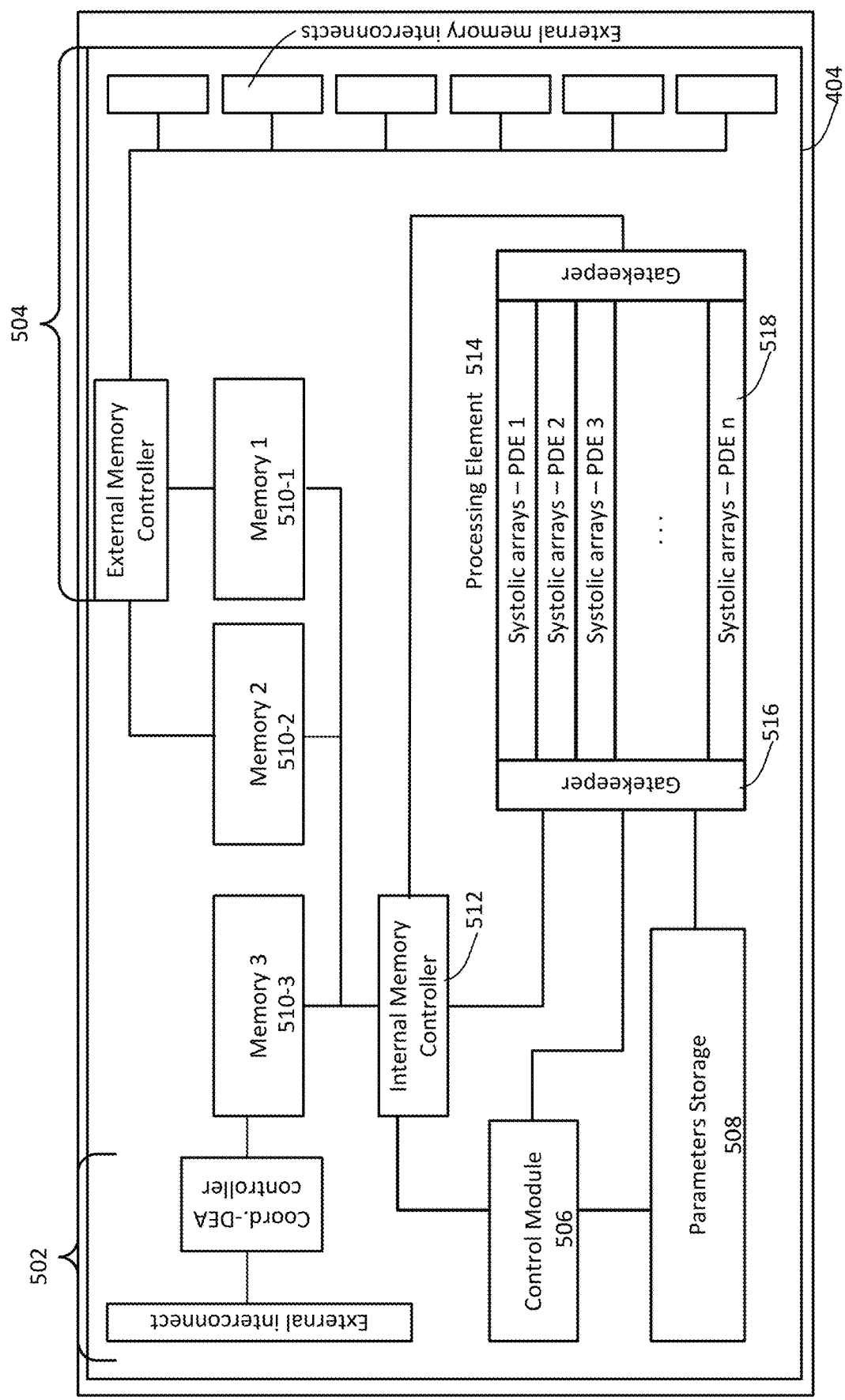
FIG. 5 illustrates a layout of a DEA, in accordance with some embodiments.

FIG. 5 illustrates a layout of a DEA 404, in accordance with some embodiments. The DEA comprises a coordinator-DEA interconnect and controller 502, which is a special circuit and interconnect that manages the data and control signals going back and forth between the DEA circuit and the coordinator 402. For example, the DEA may receive problem and subdomain data from the coordinator 402 via the coordinator-DEA interconnect and controller 502. The DEA may also receive instructions from the coordinator 402 (e.g., synchronization instructions to synchronize with other DEAs of the solver, instructions to begin solving, etc.). In addition, the DEA may transmit generated solution information corresponding to the received problem and subdomain back to the coordinator through the coordinator-DEA interconnect and controller 502.

The external memory interconnect & controller 504 is a special circuit and interconnect that manages data and control signals between the various DEA units. For example, as will be discussed in greater detail below, in some embodiments, the DEA may require information relating to other subdomains being processed by other DEAs of the solver. As such, the DEA may receive additional subdomain data from other DEAs via the external memory interconnect & controller 504.

The control module 506 manages the overall functioning of the DEA unit. In some embodiments, the control module 506 is a processor that processes received subdomain data, determines and stores parameters associated with the problem subdomain (e.g., in the parameters storage 508), and manages solving of the problem subdomain (e.g., using the processing element 514) over a plurality of time-steps.

The parameters storage 508 is configured to store local variables used during the solving of differential equations. In some embodiments, the parameters storage 508 is implemented as an SRAM. The stored local variables may include any type of variable expected to be highly used during solving of the problem assigned to the DEA that are not expected to change during the solving, such as subdomain data, solve type, and one or more constants to be used during the solving of the subdomain (e.g., fluid density, viscosity, etc.).

The memory 510 is used to store the problem to be solved. In some embodiments, the memory 510 of each DEA is divided into three subunits (e.g., first memory unit 510-1, second memory unit 510-2, and third memory unit 510-3). In some embodiments, the memory units 510-1 through 510-3 are implemented as part of the same memory. In other embodiments, the memory units 510-1 through 510-3 are implemented as two or more separate memory chips.

In some embodiments, first and second memory units 510-1 and 510-2 are used in general solving of the differential equation, while the third memory unit 510-3 may be used when the DEA needs to send data back to the coordinator (e.g., via the coordinator-DEA interconnect and controller 502). In some embodiments, access to the memory units 510-1 to 510-3 is managed by the internal memory controller 512. For example, the internal memory controller 512 may receive instructions from the control module 506 to retrieve data between the first and second memory units 510-1 and 510-2 and the processing element 514, move processed data to the third memory unit 510-3 in preparation for transmission to the coordinator of the solver, and/or the like.

The processing element 514 is configured to receive problem data (e.g., from the first or second memory units 510-1 and 510-2) and to solve the received problem data using one or more systolic arrays. In some embodiments, the processing element 514 comprises one or more gatekeeper circuits 516 (also "gatekeepers 516") and a plurality of systolic array circuits 518 ("systolic arrays 518"). The gatekeepers 516 are circuits that divert data from memory (e.g., from the first or second memory units 510-1 and 510-2 via the internal memory controller 512) to the systolic arrays 518 and vice versa, depending on which equation is solved. For example, the gatekeeper 516 may receive information indicating a type of differential equation to be solved from the parameters storage 508 where solver parameters are kept, and select which systolic array 518 to use to process problem data received from the first memory unit 510-1 or the second memory unit 510-2.

The systolic arrays 518 each comprise hardware configured to solve a particular type of partial differential equation (PDE). Each systolic array 518 comprises a network of elements (e.g., processing elements and storage elements) configured to process a plurality of nodes of a received (sub-)domain in parallel. Each processing element of the systolic array is configured to compute a partial result as a function of the data received from its upstream elements, and to pass results to downstream elements. In some embodiments, the systolic arrays 518 comprise at least one systolic array for each type of PDE that the DEA is designed to solve. For example, a systolic array may be configured to solve 1-D differential equations such as linear convection, non-linear convection, diffusion, Burger's equation, Laplace equation, Poisson equation, Euler's equation, Navier stokes simulations (such as Reynolds-averaged Navier Stokes (RANS) with various turbulence models, large eddy simulation (LES) Navier Stokes simulations, direct numerical simulation (DNS) Navier Stokes simulations, which may include compressible, incompressible, with energy, with energy and chemical reactions, and/or the like), etc. In some embodiments, a systolic array may be configured to solve a multi-dimensional differential equation (e.g., a two-dimensional form of any of the equation types described above, a three-dimensional form, etc.). In some embodiments, a systolic array may be configured to solve implicit or explicit problems, problems having structured mesh or unstructured mesh, etc. In some embodiments, a systolic array may be configured to solve non-fluid dynamic equations, such as Molecular dynamics problems, electronic structure problems, Black Scholes equations, Veselov equations, etc.

In some embodiments, depending on the similarity of the equation, different PDEs may be solved on the same systolic array with minor changes to the calculation made by gates of the systolic array based upon parameters provided by the parameters storage 508.

Systolic Array Design

As discussed above, the processing element of each DEA may contain multiple systolic arrays. Each systolic array of the processing element of a DEA contains hardware custom-arranged to solve problems related to a particular type of differential equation (e.g., the network of elements of the systolic array are arranged and configured to solve particular types of differential equations). Each systolic array is configured to receive a mesh of nodes (e.g., corresponding to at least a portion of the subdomain assigned to the DEA), and to process the received nodes to determine a next step (e.g., next time-step) for the nodes. For ease of discussion, the following discussion will refer primarily to processing the nodes of the mesh through a plurality of time-steps, although it is understood that the processing of nodes may be performed for other types of iterations, depending on a type of problem to be solved.

Figure 6:
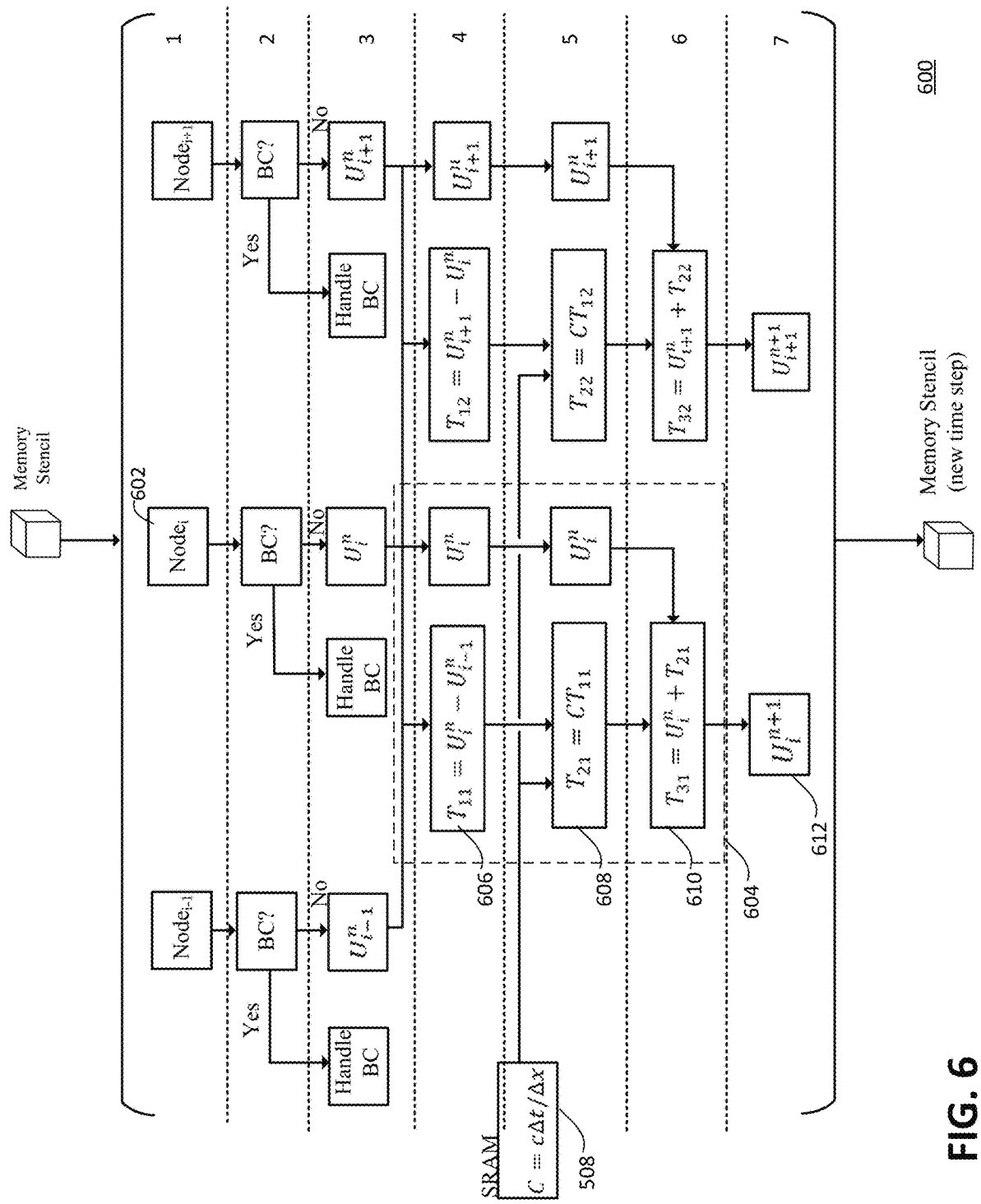
FIG. 6 illustrates a diagram of a systolic array for solving a one-dimensional differential equation, in accordance with some embodiments.

FIG. 6 illustrates a diagram of a systolic array configured to solve a one-dimensional differential equation, in accordance with some embodiments. The systolic array 600 shown in FIG. 6 is configured to solve problems relating to the simple one-dimensional differential equation shown in Equation (2) below:

$$\frac{\partial u}{\partial t} + c\frac{\partial u}{\partial x} = 0 \quad (2)$$

The differential equation of Equation (2) can be expressed as in a discretized form, shown in Equation (3) below.

$$u_i^{n+1} = u_i^n - c\frac{\Delta t}{\Delta x}(u_i^n - u_{i-1}^n) \quad (3)$$

As shown in Equation (3), each node of the processed sub-domain for a next time-step may be determined as a function of one or more nodes of the sub-domain for the current time-step. In some embodiments, where the node being computed is near an edge of the sub-domain assigned to the DEA, one or more nodes needed to compute the next time-step for the node may be part of another sub-domain assigned to another DEA of the solver. In such cases, each DEA of the solver may, for each time-step, share one or more nodes with other DEAs, the shared nodes corresponding to nodes needed by the other DEAs to compute node values for the next time-step.

In some embodiments, the domain of the problem to be solved is a structured mesh and the time-steps are at fixed intervals. The solver coordinator (or the DEA controller 506) may identify one or more parameters of the discretized equation (3) (e.g., parameters that are not expected to change during solving), and store the identified parameters in the parameters module 508. For example, in Equation (3) above, the parameter storage 508 may store the parameter $$C = c\frac{\Delta t}{\Delta x},$$

which can be used at each time-step for determining a value of a node for a subsequent time-step. In cases where the problem involves a structured mesh with fixed time intervals, the parameter C may be a constant, due to $\Delta t$ and $\Delta x$ being constant values, allowing the value of C to be stored in the parameter storage 508 (e.g., SRAM). In cases where the problem involves an unstructured mesh and/or non-uniform time intervals, the parameter module may be used to store fundamental constants such as viscosity, Prantl number, etc., which may be used by the systolic array to determine $\Delta t$ and $\Delta x$ for each iteration.

The systolic array 600 is configured to receive a plurality of node values corresponding to a first time-step from a memory of the DEA (e.g., initially from the third memory unit 510-3 when the domain data is first received from the coordinator, and then from the first memory unit 510-1 and/or the second memory unit 510-2), and to output the nodes for the next time-step to another memory unit of the DEA (e.g., from the first memory unit 510-1 to the second memory unit 510-2, or vice versa). In some embodiments, the systolic array may output the next-step node values into the same memory unit.

In some embodiments, the systolic array may be able to receive and process all nodes of the subdomain assigned to the DEA at once. In other embodiments, due to bandwidth limitations, the systolic array receives a portion of the nodes of the subdomain at a time. Portions of the sub-domain may be processed in a specific order. For example, the systolic array may be configured to process nodes at the center of the subdomain first, and move outwards to the edge of the subdomain. In cases where the DEA receives sub-domain data from other DEAs of the solver corresponding to node-values needed for computing nodes at or near the edge of the DEA's assigned subdomain, this may allow for the systolic array to begin processing nodes of the sub-domain without unnecessary delay.

The systolic array 600 receives node value data from the memory unit, and may store the received node values in one or more input storage elements 602 (e.g., registers). In some embodiments, the systolic array 600, before processing each node, checks if the node is a boundary condition (BC) (e.g., if the node is at a boundary of the domain specified by the problem package) using a boundary check circuit. If the node is a boundary condition, processing for the node may be handled separately (e.g., in a separate portion of the systolic array, not shown).

The systolic array 600 comprises, for each node to be processed, a sub-array 604 comprising a network of processing elements configured to receive and process the node, at least one other node of the mesh (e.g., an adjacent node of the mesh), and at least one stored parameter to compute a value of the node for a next time step. The processing elements may comprise arithmetic units (e.g., adders, multipliers), logical operation units, conditional statement units, etc. For example, as illustrated in FIG. 6, the systolic array 600, the sub-array for a particular node (e.g., node $u_i^n$) comprises a first adder 606 configured to receive a value of the node $u_i^n$ and a value of a previous node of the mesh $u_{i-1}^n$, and to determine a difference between the node $u_i^n$ and the previous node $u_{i-1}^n$. The sub-array further comprises a first multiplier 608 configured to receive an output of the first adder 606 and a value of a stored parameter C (e.g., stored in the parameters storage 508), and determine a product of the output of the first adder 606 and the stored parameter C. A second adder 610 is configured to receive a value of the node $u_i^n$ and an output of the first multiplier 608, and determine a difference between them, which is output as the node value of the next time-step $u_i^{n+1}$. In some embodiments, each of the next time-step node values are stored in a respective output storage element 612 (e.g., register), where they can then be stored to an output memory unit. As used herein, it is understood that an "adder" may in some embodiments perform addition and/or subtraction functions, and a multiplier may perform multiplication and/or division functions.

In addition, the value of the node $u_i^n$ is passed to the network of arithmetic units for a subsequent node in the mesh ($u_{i+1}^n$) (e.g., the sub-array for node $u_{i+1}^n$), for use in calculating a value for that node for the next time-step.

As such, each systolic array comprises a plurality of sub-arrays, each configured to process a received node using a plurality of arithmetic units arranged in accordance with a discretized form of the differential equation that the systolic array is designed to solve. Each sub-array is configured to receive a value of its respective node, values of one or more additional nodes of the mesh, and values of one or more stored parameters, to determine a value of the node for the next time-step. In some embodiments, values of the one or more additional nodes of the mesh may be received from a separate DEA, if the nodes correspond to portions of the mesh outside the DEA's assigned sub-domain (e.g., node values transmitted from another DEA and stored in the memory unit 510-1 or 510-2, and fed to the systolic array). In some embodiments, the values corresponding to nodes received from other DEAs are not processed by a respective sub-array (due to being outside the assigned sub-domain of the DEA).

As shown in FIG. 6, the arithmetic units of each sub-array may be arranged in a plurality of branches, each branch configured to calculate a respective term of the discretized form of the differential equation, and an aggregator that aggregates the terms calculated by each branch to produce a value of the node for the next time-step. For example, the sub-array 604 illustrated in FIG. 6 comprises a first branch (comprising adder 606 and multiplier 608) to calculate the $$c\frac{\Delta t}{\Delta x}(u_i^n - u_{i-1}^n)$$

term of Equation (3), a second branch that provides the value of the $u_i^n$ term of Equation (3), and an aggregator (e.g., adder 610) that aggregates the values of the first and second branches to output the value of the node for the next time-step.

Figure 7:
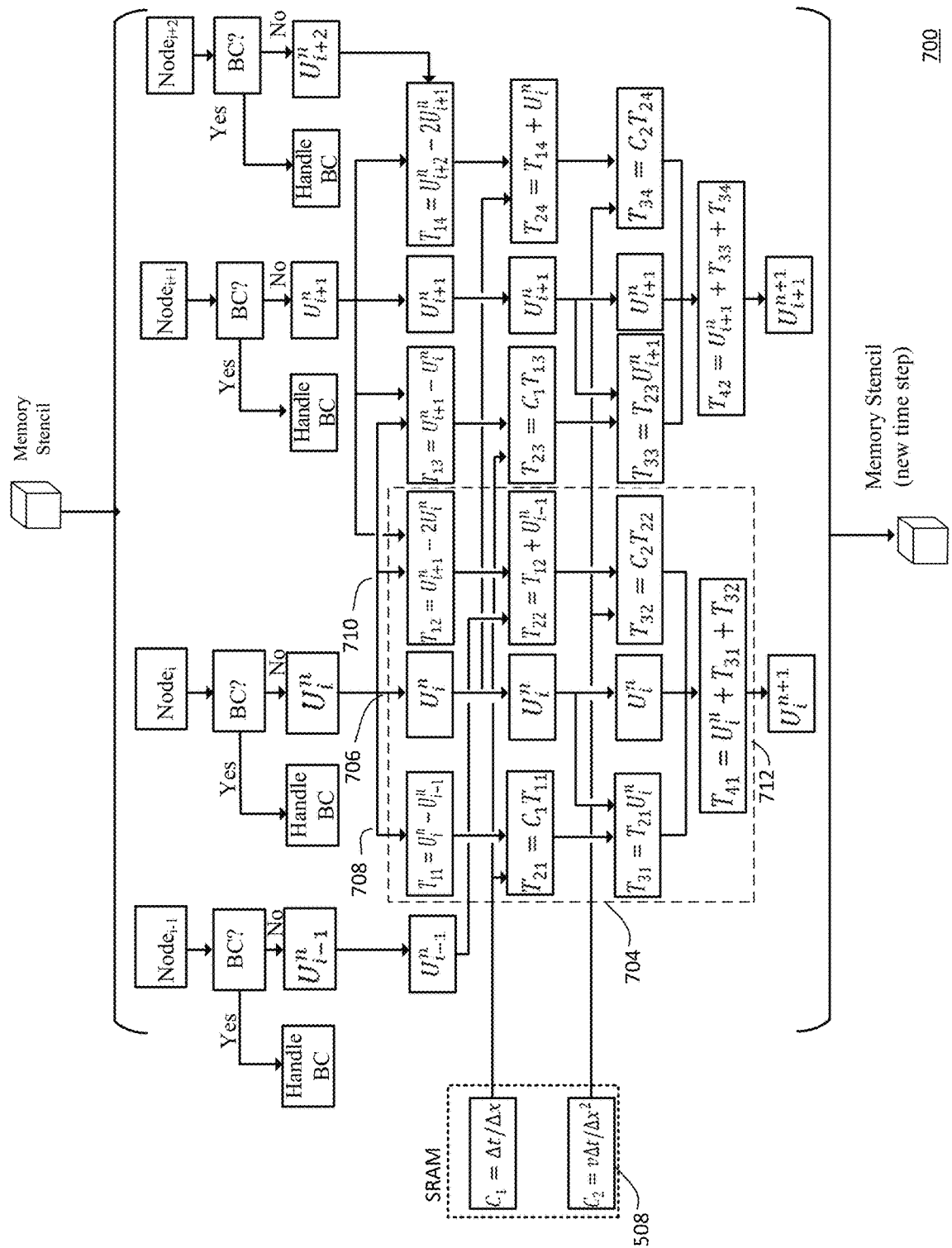
FIG. 7 is a diagram of a systolic array for solving problems relating to a two-dimensional differential equation, in accordance with some embodiments.

While FIG. 6 illustrates an example of a systolic array designed for a simple one-dimensional differential equation, it is understood that more complex systolic arrays may be configured to solve more complex differential equations. FIG. 7 is a diagram of a systolic array configured to solve problems relating to a two-dimensional differential equation, in accordance with some embodiments. The systolic array 700 illustrated in FIG. 7 is configured to solve problems relating to Burger's equation, shown in Equation (4) below:

$$\frac{\partial u}{\partial t} + u\frac{\partial u}{\partial x} = v\frac{\partial^2 u}{\partial x^2} \qquad (4)$$

Burger's equation (as shown in Equation (4)), can be expressed in a discretized form as shown in Equation (5).

$$u_i^{n+1} = u_i^n - u_i^n \frac{\Delta t}{\Delta x}(u_i^n - u_{i-1}^n) + v\frac{\Delta t}{\Delta x^2}(u_{i+1}^n - 2u_i^n + u_{i-1}^n) \qquad (5)$$

In some embodiments, the domain of the problem to be solved is a structured mesh and the time-steps are at fixed intervals. The discretized equation of the differential equation may be associated with the stored parameters $C_1 = \Delta t/\Delta x$ and $C_2 = v^* \Delta t/\Delta x$. In embodiments where the domain includes unstructured meshes, the domain may include the coordinates of each node (e.g., x, y, z coordinates). In such cases, the DEA may dynamically calculate the delta x, y, z to be used in the calculation of the dependent parameters for each node. In some embodiments, this allows the solver to dynamically adjust the spacing of nodes in the mesh (e.g., to have a higher resolution in areas where there is more action, such as higher energy, vorticity, etc.). In some embodiments where the problem involves non-uniform time steps, the parameters storage (e.g., SRAM) may store an array of delta t values for all time steps. In other embodiments, delta t values may be dynamically calculated as a function of time step or based on aggregate values such as energy, momentum, etc. (e.g., if delta t is too large, calculations may become unstable and deviations to aggregate conserved values such as energy or momentum may appear. In response, the DEA may dynamically decrease the size of delta t in regions of instability to restore stability in the system, and/or dynamically increase delta t if the system has been stable for some time).

As shown in Equation (5), the discretized equation of the Burger's equation may be expressed as an aggregation (e.g., sum) of three different terms $$\left(u_i^n, \ u_i^n \frac{\Delta t}{\Delta x}(u_i^n - u_{i-1}^n), \text{ and}\right.$$
$$\left. v\frac{\Delta t}{\Delta x^2}(u_{i+1}^n - 2u_i^n + u_{i-1}^n)\right).$$

The sub-array 704 for each input node of the systolic array 700 may be divided into a plurality of branches, each branch comprising arithmetic units for computing a particular term of the discretized equation. For example, the sub-array 704 for the node $u_i^n$ comprises a first branch 706 that computes the term $u_i^n$, a second branch 708 that computes the term $$u_i^n \frac{\Delta t}{\Delta x}(u_i^n - u_{i-1}^n),$$

based upon the values of the node $u_i^n$, another node of the mesh ($u_{i-1}^n$), and a stored parameter ($C_1$), and a third branch 710 that computes the term $$v\frac{\Delta t}{\Delta x^2}(u_{i+1}^n - 2u_i^n + u_{i-1}^n),$$

based upon the values of the node $u_i^n$, another node of the mesh ($u_{i+1}^n$), and a stored parameter ($C_2$). A final adder 712 of each sub-array 704 aggregates the terms corresponding to the outputs of each branch, to determine the value of the node $u_i^{n+1}$ for the next time-step.

In some embodiments, the systolic array processes each received node over a plurality of clock cycles. For example, the systolic array 600 illustrated in FIG. 6 is configured to process a node over 7 clock cycles. The processing elements of the systolic array are arranged in a plurality of "layers." During each clock cycle, data from elements of each layer (e.g., processing elements, such as in branch 708, or registers storing values to be used in subsequent layers, such as in branch 706) are passed to the elements of the next layer corresponding to the next clock cycle, allowing for the systolic array to receive new node data each cycle (e.g., until all nodes of the mesh have been processed for the current time step).

As discussed above, in some embodiments, a node may correspond to a boundary condition. If a particular element/node within the domain is a boundary condition, then it may be handled in parallel within the systolic array whilst processing the new time step for the rest of the elements/nodes of the domain. This may be due to normal processing by the systolic array needing data corresponding to other nodes in the mesh that are not available due to being outside the boundary of the domain.

Table 1 illustrates example processing techniques for boundary conditions within the systolic array that may be used in some embodiments. However, it is understood that the processing techniques used for handling boundary conditions are not limited to those listed in Table 1.

In some embodiments, the way a boundary condition is processed is selected based upon a type of differential equation being solved. In other embodiments, a boundary condition processing technique may be indicated by the problem package. For example, each node of the problem domain may contain information indicating whether the node is on a boundary of the domain, and if so, a type of boundary. Each boundary condition processing technique indicates a property of a parameter u at the boundary of a domain, such as a value of the parameter being described by a certain function (Dirichlet), a rate of change of the parameter being described by a function (Neumann), and/or the like. In addition, each type of boundary condition may be expressed in a discretized form.

TABLE 1

| Name | Form | Discretized |
|---|---|---|
| Dirichlet | $u = f(t)$ | $U_i = f(t)$ |
| Neumann | $\frac{du}{dx} = f(t)$ | $(U_{i+1} - U_i)/\Delta x = f(t)$ |
| Robin | $C_0 u + C_1 \frac{du}{dx} = f(t)$ | $C_0 U_i + (U_{i+1} - U_i)/\Delta x = f(t)$ |
| Cauchy | $u = f(t)$ and $\frac{du}{dx} = g(t)$ | $U_i = f(t)$ and $(U_{i+1} - U_i)/\Delta x = f(t)$ |
| Mirror | $u(x_{i-1}, t) = u(x_{i+1}, t)$ | $U_{i-1} = U_{i+1}$ |

As used in Table 1, f and g are functions of time. In some embodiments, f and g may be fixed valued constants. For example, for an inlet in a virtual wind tunnel problem, the boundary condition may be $U_{(inlet)}$="some wind speed" for all time steps. In some embodiments, some types of boundary conditions (e.g., periodic boundary conditions ($U_i=U_n$)) may be handled by the memory controllers. For example, in cases where a domain is wrapped around on itself, the domain may be expressed by imposing certain constraints on the boundaries of the domain (e.g., making a right boundary of the domain equal to the left boundary). In some embodiments, these constraints are not able to be processed by the systolic array. Instead, the memory controller, upon receiving processed node data from the systolic array, may force the values of the sub-domain boundary in accordance with the constraint.

Therefore, as described above, the processing array of each DEA may comprise a plurality of systolic arrays, each configured to solve problems relating to a particular type of differential equation. Each systolic array is configured to receive data for a plurality of nodes at a first time-step, and determine values for the nodes at a subsequent time-step using a sub-array of arithmetic units arranged based upon a discretized form of the differential equation. The sub-array may determine the values of a node for a subsequent time-step based upon a combination of the value of the node at the current time-step, one or more other nodes of the sub-domain at the current time-step, and one or more stored parameters. Each sub-array may comprise a plurality of branches, each branch comprising arithmetic units for calculating a respective term of the discretized form of the differential equation, and an aggregator to aggregate the plurality of terms to determine the value of the node for the subsequent time-step. When processing a sub-domain, the DEA determines a type of differential equation for each time-step, and selects an appropriate systolic array to be used. In some embodiments, each systolic array is configured to receive input node values from any of the memory units of the DEA (e.g., first, second, or third memory units 501-1, 510-2, and 510-3), and to output determined node values to any of the memory units. In some embodiments, the systolic array receives input node values from the first memory unit 510-1 or the second memory unit 510-2, and outputs processed node values to the other memory unit.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A system configured for discretized solving of partial differential equations, comprising:
    a first memory configured to store a plurality of nodes of a domain corresponding to a first time-step, the nodes of the domain associated with a partial differential equation having a discretized form having a plurality of terms;
    a plurality of systolic arrays, each corresponding to a respective partial differential equation type; and
    a controller configured to select a systolic array of the plurality of systolic arrays, based upon a type of the partial differential equation, the systolic array having a plurality of sub-arrays and the systolic array configured to receive at least a portion of the plurality of nodes from the first memory, and process each received node in parallel using a respective sub-array of the plurality of sub-arrays, the respective sub-array comprising:
        a plurality of branches, each corresponding to a respective term of the discretized form of the partial differential equation and comprising a respective set of circuit elements to receive a value of the node to generate the respective term;
        wherein a respective set of circuit elements of at least one branch of the plurality of branches comprises a set of arithmetic circuits arranged in accordance with a respective term of the discretized form of the partial differential equation corresponding to the at least one branch, and is configured to determine the respective term based at least upon the value of the node and a value of at least one other node of the domain;
        an aggregator configured to receive the respective terms from each of the plurality of branches, and to aggregate the received terms to generate a node corresponding to a second time-step;
    a second memory to receive nodes corresponding to the second time step generated by the plurality of sub-arrays from the selected systolic array.

2. The system of claim 1, wherein the controller is further configured to control the systolic array to:
    receive, from the second memory, the generated nodes corresponding to the second time step;
    process the received nodes corresponding to the second time step to generate nodes corresponding to a third time step; and
    store the generated nodes corresponding to the third time step in the first memory.

3. The system of claim 1, wherein the controller is further configured to extract one or more constants associated with the discretized form of the partial differential equation, and to store the one or more constants at a parameter storage, and wherein each sub-array is configured to generate the node corresponding to the second time step based upon at least one constant of the one or more constants.

4. The system of claim 1, wherein the at least one other node of the domain corresponds to an adjacent node of the domain.

5. The system of claim 1, wherein the plurality of branches of the respective sub-array are configured to generate the respective terms in parallel over a same plurality of clock cycles, wherein the respective sets of circuits elements of the plurality of branches are arranged into a plurality of layers corresponding to the plurality of clock cycles such that, during each clock cycle, data at circuit elements of a layer at each of the plurality of branches are passed to circuit elements of a subsequent layer at each of the plurality of branches.

6. The system of claim 1, wherein the systolic array further comprises a boundary check circuit configured to check whether a received node of the plurality of nodes corresponds to a boundary of the domain, and wherein the systolic array is further configured to, responsive to the node being associated with a boundary condition, process the node in a separate portion of the systolic array in accordance with one or more predetermined boundary condition processing techniques.

7. The system of claim 1, wherein the domain corresponds to a mesh of nodes.

8. The system of claim 7, wherein the mesh is a structured mesh where the plurality of nodes are located at fixed intervals within the domain.

9. The system of claim 7, wherein each of the plurality of nodes is associated with a finite volume on the mesh.

10. A method for discretized solving of differential equations, comprising:
   storing, in a first memory, nodes of a domain corresponding to a first time-step, the nodes of the domain associated with a partial differential equation having a discretized form having a plurality of terms;
   selecting a systolic array of a plurality of systolic arrays, wherein each systolic array corresponds to a respective partial differential equation type, based upon a type of the partial differential equation, the selected systolic array having a plurality of sub-arrays;
   receiving, at the selected systolic array, at least a portion of the plurality of nodes from the first memory,
   processing, at the selected systolic array, each received node in parallel using a respective sub-array of the plurality sub-arrays, by:
      processing the node through each of a plurality of branches of the respective sub-array, each branch corresponding to a respective term of the discretized form of the partial differential equation and comprising a respective set of circuit elements to receive a value of the node to generate the respective term;
      wherein a respective set of circuit elements of at least one branch of the plurality of branches comprises a set of arithmetic circuits arranged in accordance with a respective term of the discretized form of the partial differential equation corresponding to the at least one branch, and is configured to generate the respective term based at least upon the value of the node and a value of at least one other node of the domain;
      at an aggregator of the respective sub-array, receiving the respective terms from each of the plurality of branches, and aggregating the received terms to generate a node corresponding to a second time-step;
   storing nodes corresponding to the second time step generated by the plurality of sub-arrays from the selected systolic array at a second memory.

11. The method of claim 10, further comprising:
   receiving, by the systolic array from the second memory, the generated nodes corresponding to the second time step;
   processing, at the systolic array, the received nodes corresponding to the second time step to generate nodes corresponding to a third time step; and
   storing the generated nodes corresponding to the third time step in the first memory.

12. The method of claim 10, further comprising extracting one or more constants associated with the discretized form of the partial differential equation, and storing the one or more constants at a parameter storage, and wherein each sub-array is configured to generate the node corresponding to the second time step based upon at least one constant of the one or more constants.

13. The method of claim 10, wherein the at least one other node of the domain corresponds to an adjacent node of the domain.

14. The method of claim 10, wherein the plurality of branches of the respective sub-array are configured to generate the respective terms in parallel over a same plurality of clock cycles, wherein the respective sets of circuits elements of the plurality of branches are arranged into a plurality of layers corresponding to the plurality of clock cycles such that, during each clock cycle, data at circuit elements of a layer at each of the plurality of branches are passed to circuit elements of a subsequent layer at each of the plurality of branches.

15. The method of claim 10, further comprising:
   at a boundary check circuit of the systolic array, checking whether a received node of the plurality of nodes corresponds to a boundary of the domain, and
   responsive to the node being associated with a boundary condition, processing the node in a separate portion of the systolic array in accordance with one or more predetermined boundary condition processing techniques.

16. A systolic array configured for discretized solving of differential equations of a first type, comprising:
   a plurality of sub-arrays configured to receive and process in parallel at least a portion of a plurality of nodes of a domain corresponding to a first time-step stored in a first memory, the nodes of the domain associated with a partial differential equation of the first type having a discretized form having a plurality of terms, where each sub-array processes a respective node of the received nodes, and comprises:
      a plurality of branches, each corresponding to a respective term of the discretized form of the partial differential equation and comprising a respective set of circuit elements to receive a value of the node to generate the respective term;
      wherein a respective set of circuit elements of at least one branch of the plurality of branches comprises a set of arithmetic circuits arranged in accordance with a respective term of the discretized form of the partial differential equation corresponding to the at least one branch, and is configured to determine the respective term based at least upon the value of the node and a value of at least one other node of the domain;
      an aggregator configured to receive the respective terms from each of the plurality of branches, and to aggregate the received terms to generate a node corresponding to a second time-step, and to output the generated node corresponding to the second time step for storage at a second memory.

17. The systolic array of claim 16, wherein the plurality of sub-arrays of the systolic array are further configured to:
   receive, from the second memory, generated nodes corresponding to the second time step previously output by the plurality of sub-arrays;
   process the received nodes corresponding to the second time step to generate nodes corresponding to a third time step; and
   store the generated nodes corresponding to the third time step in the first memory.

18. The systolic array of claim 16, wherein the at least one other node of the domain corresponds to an adjacent node of the domain.

19. The systolic array of claim 16, wherein the plurality of branches of the respective sub-array are configured to generate the respective terms in parallel over a same plurality of clock cycles, wherein the respective sets of circuits elements of the plurality of branches are arranged into a plurality of layers corresponding to the plurality of clock cycles such that, during each clock cycle, data at circuit elements of a layer at each of the plurality of branches are passed to circuit elements of a subsequent layer at each of the plurality of branches.

20. The systolic array of claim 16, further comprising a boundary check circuit configured to check whether a received node of the plurality of nodes corresponds to a boundary of the domain, and wherein the systolic array is further configured to, responsive to the node being associated with a boundary condition, process the node in a separate portion of the systolic array in accordance with one or more predetermined boundary condition processing techniques.

* * * * *